United States Patent [19]

Ohnishi

[11] Patent Number: 4,481,993
[45] Date of Patent: Nov. 13, 1984

[54] PNEUMATIC TIRES

[75] Inventor: Sumio Ohnishi, Amagasaki, Japan

[73] Assignee: Toyo Tire & Rubber Co., Ltd., Osaka, Japan

[21] Appl. No.: 512,654

[22] Filed: Jul. 11, 1983

[30] Foreign Application Priority Data

Jul. 9, 1982 [JP] Japan .............................. 57-120198

[51] Int. Cl.³ ............................................. B60C 11/00
[52] U.S. Cl. .............................. 152/209 B; D12/149
[58] Field of Search ........... 152/209 B, 209 R, 209 D; D12/136, 140, 149

[56] References Cited

U.S. PATENT DOCUMENTS

| 3,104,693 | 9/1963 | Bolenbach | 152/209 B |
| 4,176,703 | 12/1979 | Nojima et al. | 152/209 B |
| 4,217,943 | 8/1980 | Tsuzura | 152/209 B |
| 4,284,115 | 8/1981 | Ohnishi | 152/209 B |

FOREIGN PATENT DOCUMENTS

| 0449016 | 6/1936 | United Kingdom | 152/209 B |
| 0449017 | 6/1936 | United Kingdom | 152/209 B |

Primary Examiner—Michael W. Ball
Attorney, Agent, or Firm—Koda and Androlia

[57] ABSTRACT

A pneumatic tire having nominal rim size less than 762 mm (30 inches), flatness ratio less than 80% and a tread pattern including a plurality of lugs separated each other by a groove, said lugs comprising slanting portions which inclines relative to the equatorial line of the tire and extends from each side edge of the tread toward the each ¼ position of the tread width and transverse portions which turns toward the equatorial line and terminates in the opposite area across the equatorial line, the transverse portion of the left-hand lug alternating with the transverse portion of the right-hand lug and overlapping each other in the circumferential direction of the tire, the groove edges being curved with the radius of curvature not exceeding 1 mm, overlapped ratio eP/Tw of the lugs being within the range of 0.30 to 0.38, the ratio Lt/2×Tw being 0.25 to 0.45, the coefficient of the projective length of the groove edges being 25 to 32, the ratio Ss/Sq of the sectional areas of the grooves being 1.25 to 1.65, wherein eP is the projective length of the extension of lug extending across the equatorial line, Tw is the half width of the tread, Lt is the length of the transverse portion, Ss is the sectional area of the groove at the tread side line and Sq is the sectional area of the groove at the ¼ position of the tread width.

1 Claim, 7 Drawing Figures

PNEUMATIC TIRES

BACKGROUND OF THE INVENTION

1. Field of the Invention

The present invention relates to pneumatic tires and more particularly to an improvement of tread patterns of pneumatic tires used for relatively small construction vehicles which travel on soft ground of high water content, e.g., loam soil.

2. Prior Art

Heretofore, pneumatic tires used for small construction vehicles traveling on soft ground have been devised so as to receive the buoyancy of soft ground, namely, so as to float on the soft ground. The tractive force was obtained by making use of shear resistance generated when tires press and harden mud in the grooves of the tread pattern. In order to obtain a strong tractive force, the grooves of the tread pattern had a large width and a great depth and the round edges of grooves had a large radius of curvature.

Besides the above, there were provided with lug 2 and groove 3 having a large backward angle α directed from a neighborhood of the equatorial line TE of the tire toward the tread side line SL as shown in FIG. 1 in order to facilitate the discharge of the mud clogged in the grooves. Such tires are used by limiting the rotation to one direction.

But prior art tires having such tread patterns are still weak in their tractive force, lack in wear resistance and are susceptible to external damages such as chips, cuts, etc. Thus, the durability of prior art tires is not satisfactory.

SUMMARY OF THE INVENTION

It is therefore an object of the present invention to provide an improved tread pattern by which a strong tractive force can be obtained.

The inventor's investigation has revealed that most of the soft ground consists of lower hard ground and upper soft soil having high water content which is piled on the lower hard ground as deep as the depth of grooves of tire treads or consists of soft soil layer and gravel settling therethrough and that such hard layer as the lower hard ground or gravel causes the above described defects of prior art tires.

The inventor made researches on this subject and reached the conclusion that the tractive force can be improved by sinking tires through the upper soft layer and making use of the effect of wear resistance of the hard layer positioned lower in the soft ground.

DETAILED DESCRIPTION OF THE INVENTION

Figure 2:
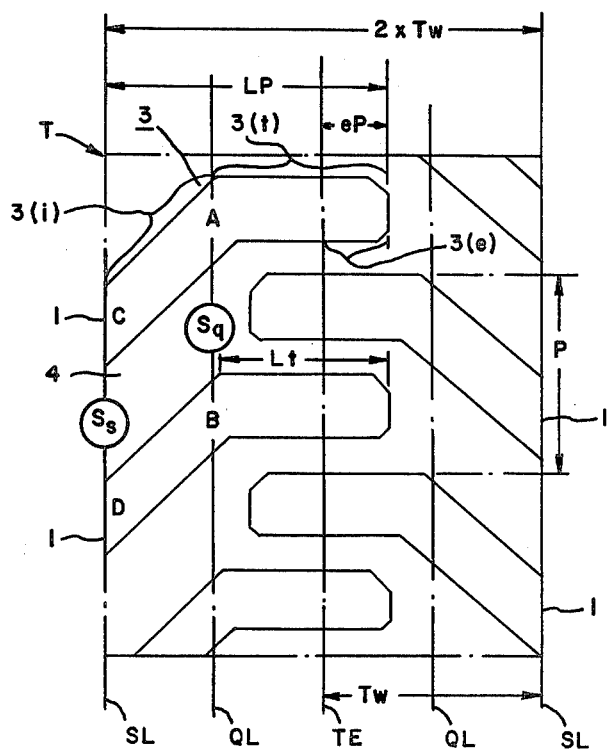
FIG. 2 is a schematic plan view of a tread pattern in accordance with the present invention.

In FIG. 2 showing an example of a tire tread pattern according to the present invention, T is a tread, TE is the equatorial line of the tire, Tw is the half width of the tread width, SL is the side line of the tread, QL is the ¼ position of the tread width, P is the lug pitch.

Figure 3:
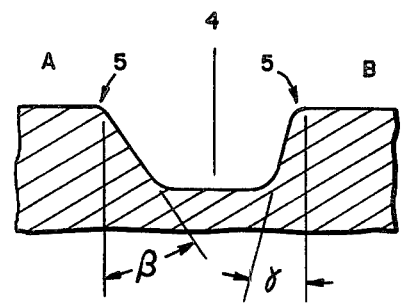
FIG. 3 is a cross-sectional view of a groove at the ¼ tread width position along the line A–B of FIG. 2.

The same number of lugs with the desired pitch P are formed on both sides of the circumference of the tread. LP is the total projective length of the lug 3. eP is the projective length of the extension 3(e) of the lug. Numeral 1 denotes the side edges of the lugs. The lug 3 comprises the slanting portion 3(i) which inclines with respect to the equatorial line of the tire and extends from the side line SL of the tread T approximately to the ¼ position QL of the tread width and the transverse portion 3(t) which turns toward the equatorial line TE of the tire and terminates in the opposite area across the equatorial line TE. The portion extending across the equatorial line TE to the opposite area is defined as the extension 3(e) of the lug. A plurality of lugs 3 are formed on the tread T with alternate disposition of the right transverse portion 3(t) and the left transverse portion 3(t). The shape of the groove 4 is as shown in FIG. 3. Cross sectional angle γ of the groove wall at the side B is smaller than the cross sectional angle β of the opposite groove wall. The preferable value of β is within the range of 15° to 45° and that of γ is within the range of 13.8° to 30°. The ratio β/γ is within the range of 1.09 to 1.5. For the most preferable embodiment, β is 20°, γ is 15° and β/γ ratio is 1.33. The edge portion 5 of the groove is curved. The reference Ss indicated in FIG. 2 shows the sectional area of the groove taken along the line C–D lying on the edge line SL of the tread. The reference SQ shows the sectional area of the groove taken along the line A–B lying on ¼ position QL of the tread width.

Tire tests were conducted under the normal inflation pressure in order to investigate the influences of the following parameters upon the tractive forces. The parameters are the radius of curvature of the curved edges of the groove, the overlapped ratio of the lug, the coefficient of the projective length of the edges and the ratio of the sectional areas.

In the above, the radius of curvature is that of the curved edge 5 in FIG. 3. The overlapped ratio of the lug is the ratio eP/Tw, i.e., the ratio of the projective length eP of the extension 3(e) of the lug extended across the equatorial line TE toward the opposite side, to the half width Tw of the tread corresponding to the width from the equatorial line TE to the tread side line SL.

The coefficient of the projective length of the curved edge is represented as $2LP \times N / \sqrt{D \times S70}$. In the above equation, LP indicates the total projective length of the lug 3. N indicates the total number of the lugs provided with on both sides. D indicates the outer diameter of the tire. S70 indicates the sectional width of the tire which was mounted to a rim whose width is 70% of the rim having the standard width.

The ratio of the sectional areas of the groove is the ratio Ss/Sq, that is, the ratio of the sectional area Sq of the groove taken along the line A–B, i.e., the sectional area of the groove at the ¼ point QL of the tread width, to the sectional area Ss of the groove taken along the line C-D, i.e., the sectional area of the side edge SL of the tread.

The tire factors of the test tires are as shown in Table 1.

TABLE 1

| Items | | size |
|---|---|---|
| Outer diameter | | 676 mm |
| Sectional width | | 211 mm |
| Flatness ratio | | 70% |
| Tread width | | 191 mm |
| Crown radius | | 270 mm |
| Depth of groove | Equatorial Portion (TE) | 11.8 mm |
| | ¼ position (QL) of tread width | 11.9 mm |
| | Section along the line C-D | 19.4 mm |
| Number of pitches (Number of P) | | 20 pcs. |

The test for tractive force was conducted on the above mentioned test tires under the condition that the tires ran on the test ground comprising lower hard ground and muddy and wet layer piled thereon. The test results are shown in Table 2.

TABLE 2

Factors & Tractive force of Test Tires

| Items | Tire No. | | | | | | | |
|---|---|---|---|---|---|---|---|---|
| | 1 | 2 | 3 | 4 | 5 | 6 | 7 | 8 |
| Overlapped ratio of lug | 0.365 | 0.365 | 0.365 | 0.365 | 0.036 | 0.036 | 0.036 | 0.036 |
| Radius of curvature of curved groove edges | 0.2 | 0.2 | 5 | 5 | 0.2 | 0.2 | 5 | 5 |
| Coefficient of projective length of groove edges | 28.4 | 24.2 | 28.4 | 24.2 | 28.4 | 24.2 | 28.4 | 24.2 |
| Ratio of sectional area of groove | 1.6 | 1.05 | 1.05 | 1.6 | 1.05 | 1.6 | 1.6 | 1.05 |
| Tractive force (kg) | 673 | 618 | 615 | 595 | 560 | 548 | 493 | 390 |

Figure 4:
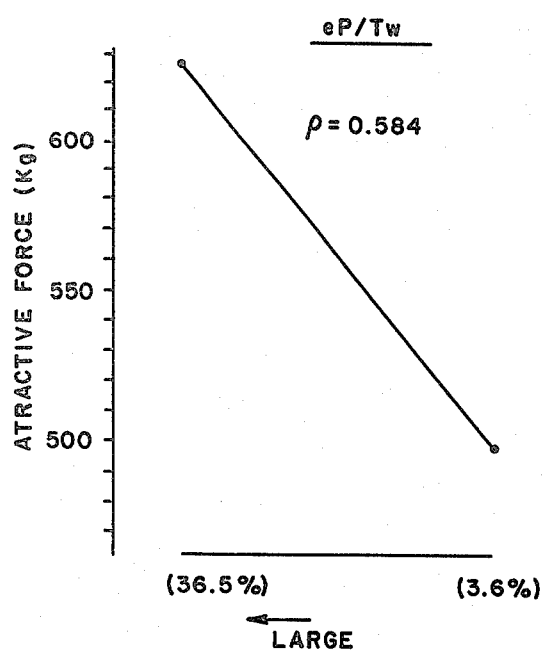
FIG. 4 is a graph showing the relationship between the overlapped ratio of the lugs and the tractive force.

Analyses of the tire factors were made according to the design of experiments in order to investigate the influences of each parameter as shown in Table 2 upon the tractive force of the test tires. The diagrams showing how the parameters of these model tires have an effect on the tractive force are as shown in FIG. 4 through FIG. 7. FIG. 4 shows the relationship between the overlapped ratio of the lug and the tractive force (kg). The overlapped ratio is an index of the size of lugs which function effectively. The overlapped ratio has a great influence on tractive force.

Tractive force tends to increase rapidly with the increase of the value of the overlapped ratio. The contribution ratio $\rho$ of the overlapped ratio was 0.584, i.e., about 58%.

Figure 5:
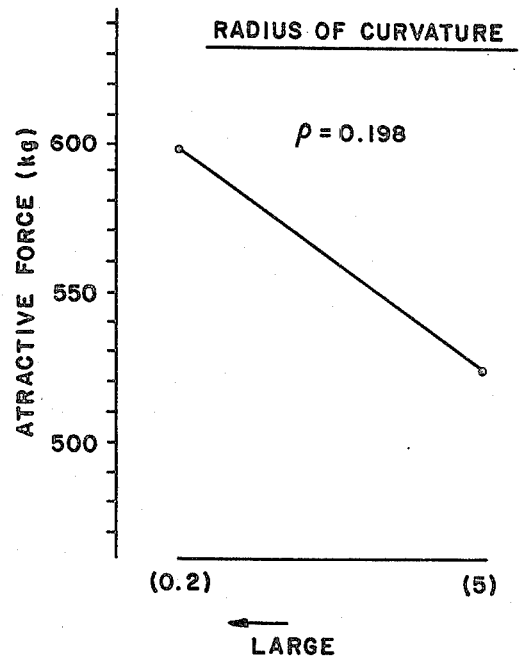
FIG. 5 is a graph showing the relationship between the radius of curvature of the curved edge of the groove and the tractive force.

FIG. 5 is a diagram showing the relationship between the radius of curvature of the curved edge of the groove and the tractive force (kg). This relationship relates to the degree of the function of preventing slips due to the engagament of the curved edges with the irregular contact face of the ground. This diagram indicates that the less the radius of curvature of the curved edges is, the stronger the tractive force is. The contribution ratio $\rho$ of the curved edges is 0.198.

Figure 6:
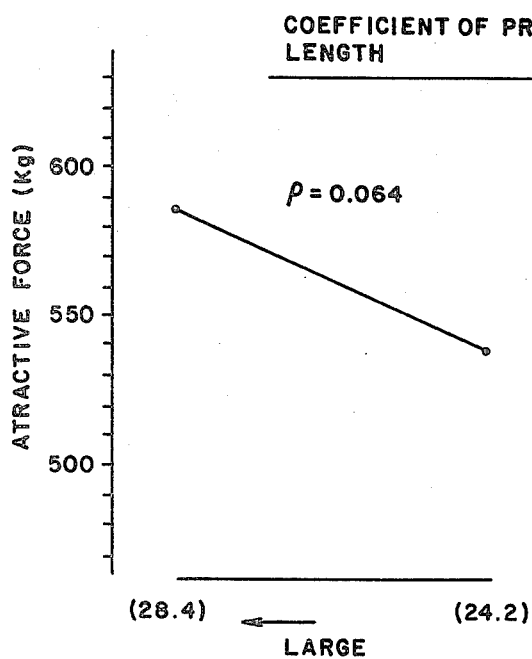
FIG. 6 is a graph showing the relationship between the coefficient of the projective length of the curved edge of the groove and the tractive force.

FIG. 6 is a diagram showing the relationship between the coefficient of the projective length of the groove edges and the tractive force. The coefficient of the projective length of the groove edges is an index for comparing the ratio of the total length of each projective length of the groove edges to the total area of the tread, when the influences of outer diameter, sectional width, inclination of grooves, etc. are fixed to be constant. The contribution ratio is low.

Figure 7:
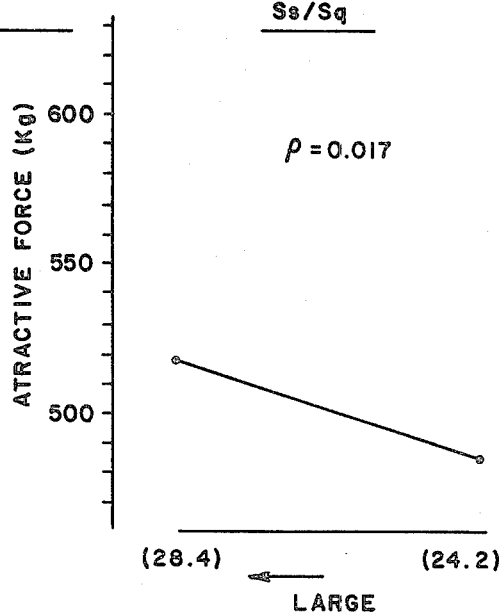
FIG. 7 is a graph showing the relationship between the ratio of the sectional area of the groove and the tractive force.

FIG. 7 is a diagram showing the relationship between the ratio of sectional area of the groove and the tractive force. This concerns the function of discharging the mud clogged in the grooves and of preventing the mud from clogging in the grooves.

Comparing the diagrams of FIG. 4 and FIG. 5 with FIG. 6 and FIG. 7, it is apparent that the lugs near the equatorial line of the tire function effectively as well as groove edges.

In prior art tires of floating type, the tractive force was obtained by utilizing the shear resistance generated when the groove walls press and harden the muddy and wet ground. Accordingly, the length of the groove edges was made greater and the sectional area of a groove was formed greater towards the side edges of the tread. But, the present invention is founded on the different findings investigated and examined as mentioned above and succeeds to obtain an increased tractive force.

Based on the findings confirmed by the tests and the results of the analyses of the tire factors, preferred conditions have been selected and thereby improved pneumatic tires have been provided.

A tire in accordance with the present invention has a nominal rim size less than 30 inches (762 mm) and a tread pattern including a plurality of lugs separated each other by a groove. The flatness ratio H/W, i.e., the ratio of the tire height H to the tire width W is less than 80%. Each lug comprises the slanting portion 3(i) which inclines with respect to the equatorial line TE of the tire and extends from the tread side line SL approximately to the ¼ point QL of the tread width and the transverse portion 3(t) which turns toward the equatorial line TE and terminates in the opposite area across the equatorial line TE. Each lug 3 is separated by the groove 4. The transverse portion 3(t) of the left-hand lug 3 alternates with the transverse portion 3(t) of the right-hand lug 3 with overlapping relation. The groove edge 5 is curved with the radius of curvature less than 1 mm. The overlapping ratio eP/Tw, i.e., the ratio of the projective length eP of the extension 3(e) which terminates in the opposite area across the equatorial line TE to the half width Tw of the tread corresponding to the width from the equatorial line TE to the tread side edge is within the range of 0.30 to 0.38. The ratio of the length Lt of the transverse portion 3(t) to the tread width, i.e., 2×Tw, namely, the ratio of Lt/2×Tw is 0.25 to 0.45. The coefficient of the projective length of the groove edge is 25 to 32. The ratio Ss/Sq of the sectional areas of the groove is 1.25 to 1.65.

For construction vehicles loading earth and stones, a tire having a wide contact width and a small outer diameter is usually used in view of operation efficiency and the stability of vehicles. A tire according to the present invention is small in flatness ratio as well. The direction of the grooves near the equatorial line of the tire is extended roughly at right angle with the direction of the forward movement of the tire so as to obtain a large tractive force. Furthermore, the grooves positioned approximately at the ¼ point of the tread width are provided with backward angles so as to discharge easily the mud clogged in the grooves near the equatorial line. The groove edges engage the irregular contact face of the hard ground.

In view of the results from the analysis mentioned above, the preferable radius of curvature of the curved edge is not more than 1 mm. The radius of curvature over 1 mm is less effective. The preferable range of eP/Tw ratio is within the range of 0.30 to 0.38. The preferable range of Lt/2×Tw with regard to the transverse lug is within the range of 0.25 to 0.45. In case eP/Tw ratio is less than 0.30, i.e., 30% and the Lt/2×Tw ratio is less than 0.25, i.e., 25%, the tractive force is small and the contact pressure of a lug becomes high. As a result, waved wear occurs near the equatorial portion and the wear resistance deteriorates. On the other hand, the eP/Tw ratio more than 0.38, i.e., 38%, and the Lt/2×Tw ratio more than 0.45, i.e., 45%, necessitate a great length of the extension of lug which extends across the equatorial line. In this case, in order to provide proper width of grooves between the lugs, the width of the lugs must be diminished or the number of pitches, i.e., the number of P must be decreased. It results in the lack of contact area of the lugs and consequently the wear resistance becomes lowered.

The coefficient of the projective length of the grooves edges is preferably within the range of 25 to 32. In case of less than 25, the wear resistance deteriorates. More than 32, the grooves are liable to be clogged with mud, so that the lugs near the equatorial portion of a tire cannot work effectively. The ratio Ss/Sq of the sectional areas of the groove is preferably within the range of 1.25 to 1.65. In case of less than 1.25, the operation discharging mud clogged in the grooves is bad. In order to make the ratio Ss/Sq more than 1.65, the grooves at the tread side line must be deeper or wider, which causes the deterioration of rigidity of the lugs at the tread side line. As a result, the lugs are broken or abnormaly worn away.

DESCRIPTION OF THE PREFERRED EMBODIMENT

Test were conducted upon the pneumatic tires in accordance with the present invention. Tire size is 33×12.5-15. Two types of tread patterns are tested, i. e., FIG. 2 type and FIG. 1 type. The test results will be shown in Table 3.

TABLE 3

Figure 1:
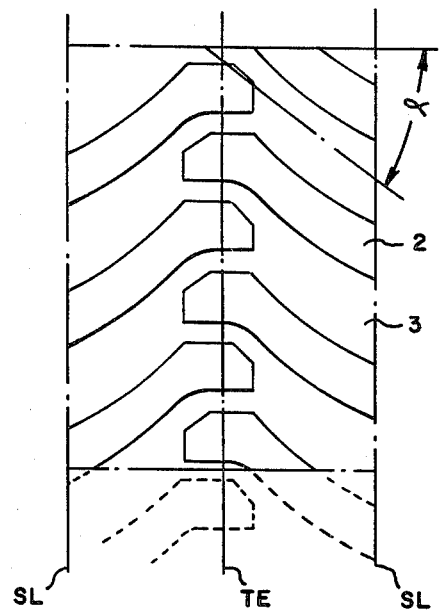
FIG. 1 is a schematic plan view of a prior art tread pattern.

| Construction factors | Tires | | | | |
|---|---|---|---|---|---|
| | Embodiment | | | Comparison | |
| | A | B | C | D | E |
| Tread pattern | FIG. 2 | FIG. 2 | FIG. 2 | FIG. 2 | FIG. 1 |
| Overlapped ratio of lug | 0.38 | 0.33 | 0.30 | 0.28 | 0.04 |
| Radius of curvature of groove edges | 0.2 | 0.2 | 0.2 | 5 | 5 |
| Coefficient of projective length of groove edges | 31 | 30 | 26 | 24 | 24 |
| Ratio of sectional area of groove | 1.60 | 1.30 | 1.30 | 1.1 | 1.70 |
| Tractive force | 680 | 615 | 600 | 435 | 370 |

Test conditions are as follows. Namely, test tires with the rims of 7JA×15DC were mounted to the driving axes of a test car. The inflation pressure was 2.4 kg. A shovel car was connected to the rear of a test car with the intermediation of load cell. The load of 860 was applied. Then the test car was driven on the soft ground with a shovel kept ready for shoveling the earth. The tractive force was measured at the time just before the tires ran idle as a result of the increased load.

The test road comprised a lower hard ground and a muddy and wet layer of loam soil piled thereon in the thickness of 50 mm. Water content thereof was 150% and corn index was 0.43.

As apparent from Table 3, the embodiment tires according to the present invention were superior to the comparison tires in the tractive force.

What is claimed is:

1. A pneumatic tire having nominal rim size less than 762 mm (30 inches), flatness ratio less than 80% and a tread pattern including a plurality of lugs separated each other by a groove, said lugs comprising slanting portions which inclines relative to the equatorial line of the tire and extends from each side edge of the tread toward the each ¼ position of the tread width and transverse portions which turns toward the equatorial line and terminates in the opposite area across the equatorial line, the transverse portion of the left-hand lug alternating with the transverse portion of the right-hand lug and overlapping each other in the circumferential direction of the tire, the groove edges being curved with the radius of curvature not exceeding 1 mm, overlapped ratio eP/Tw of the lugs being within the range of 0.30 to 0.38, the ratio Lt/2×Tw being 0.25 to 0.45, the coefficient of the projective length of the groove edges being 25 to 32, the ratio Ss/Sq of the sectional areas of the grooves being 1.25 to 1.65, wherein eP is the projective length of the extension of lug extending across the equatorial line, Tw is the half width of the tread, Lt is the length of the transverse portion, Ss is the sectional area of the groove at the tread side line and Sq is the sectional area of the groove at the ¼ position of the tread width.

* * * * *